United States Patent
Certain

(10) Patent No.: US 10,047,678 B2
(45) Date of Patent: Aug. 14, 2018

(54) METHOD OF STOPPING A ROTORCRAFT ENGINE IN OVERSPEED, AND A SYSTEM AND A ROTORCRAFT ASSOCIATED THEREWITH

(71) Applicant: AIRBUS HELICOPTERS, Marignane (FR)

(72) Inventor: Bernard Certain, Aix en Provence (FR)

(73) Assignee: Airbus Helicopters, Marignane (FR)

(*) Notice: Subject to any disclaimer, the term of this patent is extended or adjusted under 35 U.S.C. 154(b) by 290 days.

(21) Appl. No.: 14/867,357

(22) Filed: Sep. 28, 2015

(65) Prior Publication Data

US 2016/0090918 A1    Mar. 31, 2016

(30) Foreign Application Priority Data

Sep. 26, 2014    (FR) ...................... 14 02171

(51) Int. Cl.
   *F02C 9/28*    (2006.01)
   *F02C 9/26*    (2006.01)
   (Continued)

(52) U.S. Cl.
   CPC ............... *F02C 9/28* (2013.01); *F01D 21/00* (2013.01); *F01D 21/003* (2013.01); *F01D 21/02* (2013.01); *F01D 21/04* (2013.01); *F01D 21/06* (2013.01); *F01D 21/14* (2013.01); *F02C 3/04* (2013.01); *F02C 3/10* (2013.01); *F02C 7/22* (2013.01); *F02C 9/26* (2013.01); *F02C 9/46* (2013.01); *F05D 2220/323* (2013.01);
   (Continued)

(58) Field of Classification Search
   CPC .......................... F01D 21/02; F05D 2270/021
   See application file for complete search history.

(56) References Cited

U.S. PATENT DOCUMENTS

| 4,625,510 A | 12/1986 | Evans |
| 5,775,089 A | 7/1998 | Skarvan |

(Continued)

FOREIGN PATENT DOCUMENTS

| EP | 2570617 | 3/2013 |
| FR | 2962165 | 1/2012 |

(Continued)

OTHER PUBLICATIONS

French Search Report for French Application No. FR 1402171, Completed by the French Patent Office on Jun. 11, 2015, 8 Pages.

*Primary Examiner* — Gerald L Sung
*Assistant Examiner* — Scott Walthour
(74) *Attorney, Agent, or Firm* — Brooks Kushman P.C.

(57) ABSTRACT

A method of stopping an engine of a rotorcraft in overspeed, the engine comprising a gas generator and a power assembly. When the engine is in operation, the engine is automatically stopped when the following three conditions are satisfied simultaneously: a torque (Tq) measured on the power assembly is below a predetermined torque threshold (Tq1); and a speed of rotation referred to as a "first speed of rotation (N1)" of the gas generator is above a threshold referred to as a "first speed threshold (S1)"; and a speed of rotation referred to as a "second speed of rotation (N2)" of the power assembly is above a threshold referred to as a "second speed threshold (S2)".

15 Claims, 1 Drawing Sheet

(51) Int. Cl.
    *F02C 7/22*     (2006.01)
    *F01D 21/04*    (2006.01)
    *F01D 21/00*    (2006.01)
    *F01D 21/14*    (2006.01)
    *F01D 21/06*    (2006.01)
    *F01D 21/02*    (2006.01)
    *F02C 3/10*     (2006.01)
    *F02C 9/46*     (2006.01)
    *F02C 3/04*     (2006.01)

(52) U.S. Cl.
    CPC .. *F05D 2220/329* (2013.01); *F05D 2270/021* (2013.01); *F05D 2270/09* (2013.01); *F05D 2270/091* (2013.01); *F05D 2270/093* (2013.01); *F05D 2270/304* (2013.01); *F05D 2270/331* (2013.01); *F05D 2270/335* (2013.01)

(56) References Cited

U.S. PATENT DOCUMENTS

| | | | |
|---|---|---|---|
| 2011/0046863 A1* | 2/2011 | Tezuka | F01D 21/02 701/100 |
| 2012/0101666 A1* | 4/2012 | Hill | B64D 25/00 701/3 |
| 2012/0116613 A1 | 5/2012 | Daumas | |
| 2013/0098042 A1 | 4/2013 | Frealle et al. | |
| 2013/0247577 A1 | 9/2013 | Rossotto et al. | |
| 2013/0327119 A1* | 12/2013 | Haehner | G01L 3/104 73/1.09 |
| 2016/0298486 A1* | 10/2016 | Langford | F01D 21/02 |

FOREIGN PATENT DOCUMENTS

| | | | |
|---|---|---|---|
| FR | 2967213 | 5/2012 | |
| FR | 2972256 A1 * | 9/2012 | ........ G01L 25/003 |
| FR | 2980174 | 3/2013 | |
| WO | 9304418 | 3/1993 | |

* cited by examiner

METHOD OF STOPPING A ROTORCRAFT ENGINE IN OVERSPEED, AND A SYSTEM AND A ROTORCRAFT ASSOCIATED THEREWITH

CROSS REFERENCE TO RELATED APPLICATION

This application claims priority to French patent application No. FR 14 02171 filed on Sep. 26, 2014, the disclosure of which is incorporated in its entirety by reference herein.

BACKGROUND OF THE INVENTION (1) Field of the Invention

The present invention relates to a method of stopping an engine in overspeed, to such an overspeed safety system, and to an aircraft including such an overspeed safety system.

The invention relates to the general technical field of systems that provide operating safety for aircraft engines, and in particular operating safety for a rotorcraft turboshaft engine.

The present invention relates more particularly to protecting a power plant in the event of an engine suffering overspeed.

(2) Description of Related Art

A rotorcraft includes at least one engine for rotating at least one rotor. Such a rotor provides said rotorcraft with at least part of its lift, or even its propulsion. By way of example, a twin-engine rotorcraft generally includes first and second engines acting together to drive a main rotor providing lift and/or also propulsion via a power drive train.

The first and second engines are generally controlled by respective first and second control units. Such control units are known by the acronym FADEC for "full authority digital engine control".

Each control unit may comprise a computer and peripheral monitoring and control units constituting interfaces between the cockpit and the associated engine of the aircraft.

The engines may be turboshaft engines.

A turboshaft engine conventionally comprises a gas generator. The gas generator comprises in succession at least one compressor, a combustion chamber, and at least one expansion turbine, the compressor being mechanically linked to the expansion turbine by a drive shaft.

In addition, the turboshaft engine comprises a power assembly located downstream from the gas generator. That power assembly is sometimes provided with at least one power turbine set in rotation by the outgoing gas leaving the gas generator. The power turbine rotates a drive shaft engaging with the power transmission train that is connected to a rotor.

The power turbine is said to be "free" when said turbine is not connected by a shaft to the gas generator.

In particular, in the event of the power transmission train breaking or in the event of a freewheel in the power train slipping, the speed of rotation of the free turbine of a turboshaft engine can increase considerably. As from a threshold, the person skilled in the art then considers that such a turboshaft engine is suffering overspeed, where such overspeed can lead to the speed of rotation of the engine running away and to the engine bursting.

Consequently, aircraft are generally provided with safety systems so as to try to limit the impact of such overspeed on the aircraft and its occupants.

A mechanical system for providing protection against blade-shedding may sometimes be used for an engine with a free turbine.

This mechanical system comprises a ring of shielding arranged around the free turbine. In addition, each blade of the free turbine is fastened to a hub by a fuse element.

Beyond a threshold speed of rotation, the fuse elements break. Each blade is then separated from the hub. However, these blades remain contained inside the engine as a result of the shield.

The ejection of the blades from the free turbine causes the speed of rotation of said free turbine to slow down, and thus makes it possible to stop overspeeding of the free turbine.

Nevertheless, the engine is partially destroyed as a result of the blades being ejected. Furthermore, stopping the rotation of a free turbine does not necessarily cause the gas generator of the engine to stop.

Consequently, an electronic shutdown system can be implemented to stop turboshaft engines in order to prevent overspeeding.

The manufacturer of a turboshaft engine then establishes for example a threshold for the speed of rotation of the free turbine of said turboshaft engine. When that threshold is reached, the control unit stops the engine. In that configuration, the engine is not damaged by the safety system.

Document FR 2 962 165 suggests comparing only the engine torque transmitted by a free turbine with a torque threshold.

Nevertheless, the use of a single speed or torque monitoring threshold can cause untimely shutting down of the engine, e.g. when the rotorcraft performs a severe maneuver. Under such circumstances, such a monitoring system is sometimes not arranged on a single-engine aircraft.

On a twin-engine rotorcraft, engine shutdown can be inhibited in the event of the other engine already being shut down because of overspeeding, in order to avoid untimely shutting down of both engines. After a first engine has shut down, the stopping in flight of the second engine is then no longer authorized.

Under such circumstances, the second engine cannot, however, be stopped in the event of overspeeding. Such a situation is improbable, but not impossible. Consequently, if the second engine is subsequently in an overspeed condition, the second engine cannot be shut down automatically because its protection is inhibited. The second engine thus risks being in an overspeed situation.

In a variant, a pilot may then manually reset an electronic protection system against the overspeed of the second engine in order to avoid such a situation.

In this context, the turboshaft engine of a single-engine rotorcraft is sometimes fitted with a mechanical protection system of the "blade shedding" type.

However, a single-engine rotorcraft is not generally fitted with an electronic system for avoiding untimely shutting down of the only engine of the aircraft.

Twin-engine rotorcraft may however include a mechanical protection system of the "blade shedding" type for each engine, and an electronic shutdown system.

In addition, the technological background comprises a protection device that shuts down an engine in overspeed providing that a comparison is performed between a mechanical power required by the rotorcraft and a predefined power threshold. The mechanical power required by the rotorcraft is calculated depending at least on the current or anticipated value for the opposing torque of a main rotor of the rotorcraft.

Document FR 2 967 213 describes a method of controlling an overspeed safety system for an aircraft having at least two engines. That method consists in setting the overspeed safety system for the engines, in monitoring the speeds of rotation of the engines, in detecting overspeed on one of the engines, in shutting down the engine in question in the event of detecting overspeed, and in inhibiting the operation of the overspeed safety system for the other engine(s) still in operation. The overspeed safety systems of the engines still in operation can be reset as a function of one or more safety parameters.

Document FR 2 980 174 and document EP 2 570 617 describe a method of controlling an overspeed safety system for an aircraft having at least two engines. In that method, a first engine is shut down when a monitoring parameter of said first engine exceeds a first threshold, and a second engine distinct from said first engine is shut down when the monitoring parameter of said second engine exceeds a second threshold, the second threshold being above said first threshold.

In particular, the monitoring parameter is the speed of rotation of the free turbine of a turboshaft engine.

Documents U.S. Pat. No. 4,625,510, WO 93/04418 and U.S. Pat. No. 5,775,089 are far removed from the invention.

BRIEF SUMMARY OF THE INVENTION

The present invention thus aims to provide an alternative method firstly for avoiding the engines of an aircraft bursting as a result of overspeed in the engines, and secondly for limiting the risk of untimely shut down occurring.

The invention thus provides a method of stopping an engine of a rotorcraft in overspeed, said rotorcraft including at least one engine, the engine comprising a gas generator and a power assembly, the power assembly having at least one power turbine set in rotation by gas coming from the gas generator, the power assembly having at least one power shaft constrained to rotate with the power turbine.

When the engine is in operation, said engine is automatically stopped when the following three conditions are satisfied simultaneously:

a torque measured on the power assembly is below a predetermined torque threshold; and a speed of rotation of the gas generator, referred to as a "first speed of rotation", is above a threshold referred to as a "first speed threshold"; and a speed of rotation of the power assembly, referred to as a "second speed of rotation", is above a threshold referred to as a "second speed threshold".

Contrary to the prior art suggesting the use of a single condition for stopping an engine, the invention verifies that three different conditions are present simultaneously.

These three conditions occur simultaneously under rare conditions, resulting for example from breakage of the power transmission train connecting the engine to a rotor.

Indeed, under these conditions, the first speed of rotation of the gas generator is high. In addition, the second speed of rotation of the power turbine increases quickly because of opposing torque that tends towards zero.

Furthermore, breakage of the power transmission train therefore induces the presence of little or zero torque on the power assembly.

Under such circumstances, this method does not propose verifying a single condition, but rather verifying that three conditions are satisfied. If these three conditions all are satisfied, the engine under consideration is stopped automatically.

Using the three conditions claimed instead of one condition makes it possible to avoid untimely shutting down, e.g. as a result of a severe maneuver of the rotorcraft.

Under such circumstances, this method is equally suitable for implementing on a twin-engine rotorcraft or on a single-engine rotorcraft.

On a single-engine rotorcraft, protection of the "blade shedding" type is advantageous in order to avoid an overspeeding engine bursting. However, the casing of the engine may be ripped open following deformation of the ring of the "blade shedding" type protection system or following a crash. Since the gas generator remains in operation, hot gas is able to escape from the ripped open engine and risks setting fire to oil or to fuel, for example.

The method claimed makes it possible to shut down the engine when overspeed is caused by breakage of the power transmission train. Consequently, the gas generator is stopped and that may tend to reduce the risk of fire after a crash, for example.

On a twin-engine rotorcraft, the method may tend to limit the risks of untimely shut down of an engine. The three criteria used are actually satisfied in rare situations resulting from breakage of the transmission train, in particular following a crash. Under such circumstances, the rotorcraft need not be provided with a cross inhibition system that could potentially, in rare cases, maintain an engine in overspeed in operation.

This method may also include one or more of the following characteristics.

Thus, the gas generator is fed by a fuel-metering device, said metering device is suitable for being set between a minimum limit inducing a minimum fuel flow rate and a maximum limit inducing a maximum fuel flow rate, and said engine is stopped automatically by setting the fuel-metering device of the engine at its minimum limit.

To this end, the metering device may be set to reach its minimum flow-rate limit when the three above-described conditions are satisfied simultaneously.

Alternatively or in addition, at least one engine includes a cock on a fuel pipe, and said engine is automatically shut down by closing the cock.

In addition, each engine is fed with fuel by at least one pump, and the pump is shut down when the three above-described conditions are satisfied simultaneously.

By way of example, a booster pump arranged in a fuel tank is stopped in order to avoid spreading fuel in the event of a fuel pipe breaking.

In addition, the torque transmitted by the power assembly may be measured by arranging a torque measuring system on the power shaft.

In addition to a method, the invention provides an overspeed safety system applying said method.

Thus, the invention provides an overspeed safety system for an engine of a rotorcraft, the engine comprising a gas generator and a power assembly, the power assembly having at least one power turbine set in rotation by the gas generator, the power assembly having at least one power shaft constrained to rotate with the power turbine, the overspeed safety system including a shutdown system for stopping operation of the engine, the overspeed safety system comprising a processor unit connected to the shutdown system.

This overspeed safety system comprises a speed sensor referred to as a "first speed sensor" for measuring a speed of rotation of the gas generator, referred to as a "first speed of rotation", the overspeed safety system including a speed sensor referred to as a "second speed sensor" for measuring a speed of rotation of the power assembly, referred to as a "second speed of rotation", the overspeed safety system comprising a torque measuring system for measuring torque transmitted by the power assembly, the processor unit being connected to the first speed sensor as well as to the second speed sensor and to the torque measuring system, and being configured to implement the above-described method by stopping the engine automatically when the following three conditions are satisfied simultaneously:

a torque transmitted by the power assembly is below a predetermined torque threshold; and a speed of rotation referred to as a "first speed of rotation" of said gas generator is above a threshold referred to as a "first speed threshold"; and a speed of rotation referred to as a "second speed of rotation" of said power assembly is above a threshold referred to as a "second speed threshold".

By way of example, each speed sensor comprises an electromagnetic sensor placed opposite a phonic wheel that is constrained to rotate with the rotary member, the speed of rotation of which it is sought to measure.

Conventionally, a phonic wheel is provided with a peripheral zone comprising teeth distributed circumferentially. The passage of the teeth of the phonic wheel in front of the electromagnetic sensor modifies the magnetic field produced, and induces an AC current in a coil of the electromagnetic sensor having a frequency that is proportional to the speed of rotation.

The torque measuring system may comprise a torque meter of the hydraulic or pneumatic or torsion type.

The torque measuring system may also comprise a strain gauge torque meter or a torque meter provided with at least one phonic wheel.

By way of example, a torque meter comprises two phonic wheels placed on either side of a portion of a shaft that is flexible in twisting, in particular the power shaft. The two phonic wheels present a reference phase offset when no torque is exerted on the power assembly. Under such circumstances, the phase offset between the two phonic wheels relative to the reference phase offset is evaluated in order to determine the torque exerted on the power shaft, and thus transmitted by said power shaft.

In addition, the shutdown system may comprise a fuel-metering device conveying fuel to the gas generator.

This shutdown system may also comprise at least one pump conveying fuel to the gas generator.

In addition, the processor unit may comprise a logic circuit or equivalent, or calculation means of the processor type or equivalent that execute instructions stored in a memory.

In particular, the processor unit may be a FADEC of the engine. It should be recalled that a FADEC represents the control unit of a turboshaft engine, this control unit being known as "full authority digital engine control".

Furthermore, the overspeed safety system may include a shield ring surrounding said power turbine, said power turbine comprising a plurality of blades, each blade being fastened to a fuse member.

The overspeed safety system is thus provided with an electronic system automatically stopping the engine when three predetermined criteria are satisfied, and a mechanical system of the "blade shedding" type.

In addition to an overspeed safety system, the invention provides a rotorcraft including such a system.

Under such circumstances, the rotorcraft includes at least one rotor, the rotorcraft including at least one engine, the engine driving a power transmission train connected to the rotor.

Furthermore, the rotorcraft includes at least one overspeed safety system of the above-described type, each overspeed safety system being connected to an engine.

By way of example, each engine is associated with an overspeed safety system.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which.

DETAILED DESCRIPTION OF THE INVENTION

Figure 1:
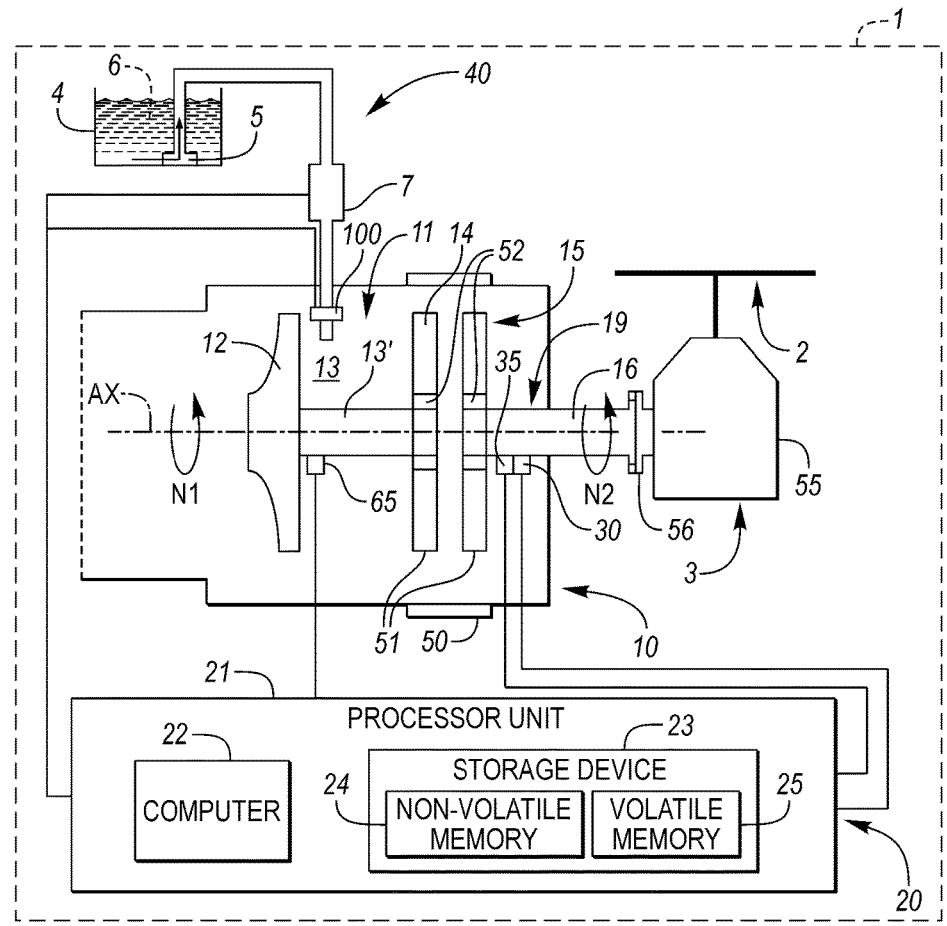
FIG. 1 shows a rotorcraft provided with a single engine.

FIG. 1 shows an aircraft 1, in particular a rotorcraft. The members of the aircraft that are not directly involved in the invention are not shown in the figure in order to avoid overloading the figure pointlessly.

In particular, this aircraft 1 is a rotorcraft including a lift and/or propulsion rotor 2. This rotor 2 is rotated by a power plant including at least one engine 10 and one power drive train 3. Such a power drive train 3 includes for example a free wheel 56 and a main gear box 55. The main gearbox 55 is provided with a mast driving a hub of the rotor 2.

Consequently, at least one engine 10 is mechanically connected to said power drive train 3.

The engine 10 of the rotorcraft is in particular a turboshaft engine.

Consequently, the engine 10 includes a gas generator 11. Conventionally, the gas 11 generator is provided with at least one compressor 12, a combustion chamber 13, and at least one expansion turbine 14. The expansion turbine 14 is connected rigidly to the compressor 12 by a shaft referred to as a "drive shaft 13'".

FIG. 1 presents a single compressor 12 and a single expansion turbine 14. Nevertheless, the number of compressor(s), and expansion turbine(s) may be optimized according to requirements, and does not restrict the ambit of the invention at all.

In addition, the compressor 12, the expansion turbine 14 and the drive shaft 13' are suitable for rotating jointly about a longitudinal axis AX of the engine 10. More precisely, the compressor 12, the expansion turbine 14, and the drive shaft 13' are constrained to rotate together about this longitudinal axis.

The speed of rotation of the gas generator should thus be understood as being the speed referred to as the "first speed of rotation N1" of the rotary assembly of the gas generator that includes the compressor 12 together with the expansion turbine 14 and the drive shaft 13'.

In addition, the engine 10 comprises a power assembly 19 located downstream from the gas generator. The power assembly is set in movement by the gas generated by the gas generator.

The power assembly 19 comprises at least one power turbine 15 located downstream from the gas generator. The term "downstream" is to be considered relative to the direction of gas flow within the engine 10.

This power turbine may be connected to the gas generator. However, in FIG. 1, the power turbine is a free turbine that is independent of the gas generator.

Consequently, the power turbine 15 is secured to a power shaft 16 that is connected to the power transmission train 3. Conventionally, the power transmission train 3 is fastened to the power shaft by a member (not shown) for accommodating angular and axial misalignments.

FIG. 1 shows a power assembly 19 including a single power turbine 15. Nevertheless, the number of power turbine(s) may be optimized depending on requirements, and does not restrict the ambit of the invention at all.

The gas leaving the gas generator then sets in rotation the power assembly of the engine at a speed of rotation referred to as the "second speed of rotation N2".

In addition, the rotorcraft comprises at least one tank 4 of fuel 6 for feeding the combustion chamber 13 with fuel.

Consequently, a fuel feed line provided with at least one pump 5 and a metering device 7 connects the tank 4 to the combustion chamber 13. The engine may further comprise a cock 100 on an internal fuel pipe.

The rotorcraft is further provided with an overspeed safety system 20 in order to avoid overspeeding of the engine 10.

This overspeed safety system 20 comprises a processor unit 21.

The processor unit may include a logic circuit or equivalent.

In the variant shown in FIG. 1, the processor unit 21 is for example provided with a storage device 23 and a computer 22. By way of example, the computer may include a processor or the equivalent for executing instructions stored in the storage device for applying the method of the invention. This storage device may include a non-volatile memory 24 storing such instructions and a volatile memory 25 storing parameter values, for example.

The processor unit 21 may be an integral part of a system for controlling a turboshaft engine, such as a system known under the acronym ECU for Engine Control Unit or FADEC for Full Authority Digital Engine Control. Consequently, the computer of the processor unit is the computer of the control system, the storage device being the device for storing said control system.

The processor unit 21 is connected by wired and/or wireless connections to a speed sensor referred to as the "first speed sensor 65". The first speed sensor 65 is arranged on the gas generator in order to measure the first speed of rotation N1 of the gas generator.

Consequently, the first speed sensor 65 transmits a signal conveying the first speed of rotation N1 to the processor unit.

The processor unit 21 is also connected by wired and/or wireless connections to a speed sensor referred to as the "second speed sensor 30". The second speed sensor 30 is arranged on the power assembly in order to measure the speed of rotation N2 of said power assembly.

Consequently, the second speed sensor 30 transmits a signal conveying the second speed of rotation N2 to the processor unit.

Furthermore, the processor unit 21 is also connected by wired and/or wireless connections to a torque measuring system 35.

This torque measuring system 35 is arranged on the power assembly in order to measure the torque Tq exerted on the power assembly 19.

Under such circumstances, the torque measuring system 35 transmits to the processor unit a signal conveying the torque transmitted by the power assembly to the power transmission train.

In addition, the processor unit 21 is connected to a shutdown system 40 suitable for stopping the engine 10. This shutdown system comprises the metering device 7 and/or the cock 100 feeding the engine 10 with fuel.

Under such circumstances, according to the method applied, the processor unit acts on the shutdown system 40 to stop the engine 10 when:

the torque Tq transmitted by the power assembly 19 is below a predetermined torque threshold Tq1, such as a torque threshold Tq1 of the order of 5% to 10% of the torque obtained when the engine develops a power known as its "maximum take-off power PMD", for example; and the first speed of rotation N1 of the gas generator is above a first speed threshold S1, such as a first speed threshold S1 of the order of 70% to 75% of a nominal speed of rotation of the gas generator obtained when the engine develops its maximum take-off power PMD, for example; and the second speed of rotation N2 of the power assembly is above a second speed threshold S2, such as a second speed threshold S2 of the order of 120% to 125% of the nominal speed of rotation of the power assembly, for example.

In normal operation, the lift rotor is driven in rotation at a nominal speed, said nominal speed imparting a nominal speed of rotation of the power assembly known to the person skilled in the art.

Consequently, when the three above-described criteria are satisfied simultaneously, the shutdown system makes it possible to stop the rotary movement of the power assembly 19 and of the gas generator 11.

In the event of a crash, the risks of oil igniting because of hot gas escaping unduly from the engine are then reduced.

If necessary, each pump 5 is also shut off.

In addition to an electronic system, the overspeed safety system may include a mechanical system of the blade shedding type.

Consequently, each blade 51 of the power turbine 15 may be fastened to a hub by a fuse member 52. This fuse member is dimensioned so as to break in the event of overspeed.

In the example shown, each blade is fastened to the power shaft by a fuse member.

In addition, the overspeed safety system comprises a shield ring 50 for containing the blades inside the engine 10.

The invention applies to a rotorcraft provided with a single engine 10 in accordance with the embodiment of FIG. 1.

Figure 2:
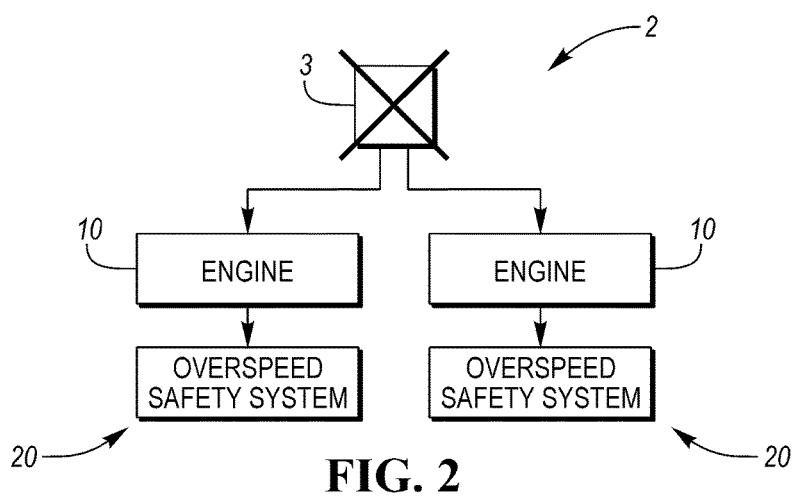
FIG. 2 shows an aircraft provided with two engines.

Nevertheless, the invention also applies to a rotorcraft including a plurality of engines 10 in accordance with the embodiment of FIG. 2.

Consequently, at least one engine 10 is provided with an overspeed safety system 20. Preferably, each engine 10 includes this overspeed safety system 20.

Naturally, the present invention may be subjected to numerous variants as to its implementation. Although several implementations are described, it should readily be understood that it is not conceivable to identify exhaustively all possible implementations. It is naturally possible to envisage replacing any of the means described by equivalent means without going beyond the ambit of the present invention.

What is claimed is:

1. A method of stopping an engine of a rotorcraft in overspeed, the engine including a gas generator and a power assembly, the power assembly having a power turbine set in rotation by gas coming from the gas generator, the power assembly having a power shaft constrained to rotate with the power turbine;

wherein when the engine is in operation, the engine is automatically stopped when the following three conditions are detected simultaneously:
a torque (Tq) measured on the power assembly is below a predetermined torque threshold (Tq1); and
a speed of rotation (N1) of the gas generator is above a first speed threshold (S1), the first speed threshold (S1) being determined based on a nominal speed of rotation of the gas generator; and
a speed of rotation (N2) of the power assembly is above a second speed threshold (S2), the second speed threshold (S2) being determined based on a nominal speed of the power assembly.

2. The method according to claim 1, wherein the gas generator is fed by a fuel-metering device, the fuel-metering device is suitable for being set between a minimum limit inducing a zero fuel flow rate and a maximum limit inducing a maximum fuel flow rate, and the engine is stopped automatically by setting the fuel-metering device of the engine at the minimum limit when the three conditions are detected simultaneously.

3. The method according to claim 1, wherein the engine includes a cock on a fuel pipe, and the engine is automatically stopped by closing the cock when the three conditions are detected simultaneously.

4. The method according to claim 1, wherein the engine is fed with fuel by a pump, and the engine is automatically stopped by shutting down the pump when the three conditions are detected simultaneously.

5. The method according to claim 1, wherein the torque (Tq) is measured by arranging a torque measuring system on the power shaft.

6. An overspeed safety system for stopping an engine of a rotorcraft in overspeed, the engine including a gas generator and a power assembly, the power assembly having (i) a power turbine set in rotation by the gas generator and (ii) a power shaft constrained to rotate with the power turbine, the rotorcraft further including a rotor and a power transmission train connected to the rotor, the power assembly connected to the power transmission train for the engine to drive the power transmission train to drive the rotor, the overspeed safety system comprising:
a first speed sensor for measuring a speed of rotation (N1) of the gas generator;
a second speed sensor for measuring a speed of rotation (N2) of the power assembly;
a torque sensor for measuring a torque (Tq) transmitted by the power assembly;
a shutdown system configured to stop operation of the engine;
a processor connected to the shutdown system, the first speed sensor, the second speed sensor, and the torque sensor;
wherein the processor is configured to control the shutdown system to stop the engine automatically when the following three conditions are detected simultaneously:
the torque (Tq) transmitted by the power assembly is below a predetermined torque threshold (Tq1);
the speed of rotation (N1) of the gas generator is above a first speed threshold (S1), the first speed threshold (S1) being determined based on a nominal speed of rotation of the gas generator; and
the speed of rotation (N2) of the power assembly is above a second speed threshold (S2), the second speed threshold (S2) being determined based on a nominal speed of rotation of the power assembly;

wherein the three conditions are detected simultaneously when overspeed of the engine is caused by a breakage of the power transmission train.

7. The overspeed safety system according to claim 6 wherein:
the shutdown system includes a fuel-metering device conveying fuel to the gas generator.

8. The overspeed safety system according to claim 6 wherein:
the shutdown system includes a pump conveying fuel to the gas generator.

9. The overspeed safety system according to claim 6 further comprising:
a shield ring surrounding the power turbine, the power turbine including a plurality of blades, each blade being fastened to a fuse member.

10. The overspeed safety system according to claim 6 wherein:
the processor is a FADEC.

11. A rotorcraft comprising:
a rotor;
an engine, the engine driving a power transmission train connected to the rotor, the engine including a gas generator and a power assembly, the power assembly having a power turbine set in rotation by the gas generator, the power assembly further having a power shaft constrained to rotate with the power turbine;
an overspeed safety system for the engine, the overspeed safety system including a shutdown system for stopping operation of the engine and a processor unit connected to the shutdown system; and
wherein the overspeed safety system further includes a first speed sensor for measuring a speed of rotation (N1) of the gas generator, a second speed sensor for measuring a speed of rotation (N2) of the power assembly, and a torque measuring system for measuring a torque (Tq) transmitted by the power assembly, the processor unit being connected to the first speed sensor, the second speed sensor, and the torque measuring system, and the processor unit being configured to stop the engine automatically when the following three conditions are detected simultaneously:
the torque (Tq) transmitted by the power assembly is below a predetermined torque threshold (Tq1);
the speed of rotation (N1) of the gas generator is above a first speed threshold (S1), the first speed threshold (S1) being determined based on a nominal speed of rotation of the gas generator; and
the speed of rotation (N2) of the power assembly is above a second speed threshold (S2), the second speed threshold (S2) being determined based on a nominal speed of rotation of the power assembly.

12. The rotorcraft according to claim 11, wherein the shutdown system comprises a fuel-metering device conveying fuel to the gas generator.

13. The rotorcraft according to claim 11, wherein the shutdown system comprises at least one pump conveying fuel to the gas generator.

14. The rotorcraft according to claim 11, wherein the overspeed safety system includes a shield ring surrounding the power turbine, the power turbine comprising a plurality of blades, each blade being fastened to a fuse member.

15. The rotorcraft according to claim 11, wherein the processor unit is a FADEC of the engine.

* * * * *